United States Patent [19]
Jegelka

[11] 4,106,884
[45] Aug. 15, 1978

[54] PRODUCTION OF ARTICLES OF FOAMED PLASTICS MATERIAL

[76] Inventor: Johann Friedrich Jegelka, Tannenstrasse 52, 6983 Kreuzwertheim, Germany

[21] Appl. No.: 782,615

[22] Filed: Mar. 30, 1977

[51] Int. Cl.² .............................................. B29C 3/02
[52] U.S. Cl. .................................. 425/345; 425/403.1; 425/446; 425/351; 425/444; 425/359; 425/4 R
[58] Field of Search ............... 425/4 R, 236, 256, 338, 425/345, 351, 404, 408, 444, 446, 451, 454, 403.1, 359

[56] References Cited

U.S. PATENT DOCUMENTS

| | | | |
|---|---|---|---|
| 1,291,637 | 1/1919 | Burkhardt | 425/338 |
| 2,257,732 | 10/1941 | Clark, Jr. | 425/351 X |
| 2,757,414 | 8/1956 | Chaloupka | 425/236 |
| 3,068,512 | 12/1962 | Van Houten | 425/338 |
| 3,810,730 | 5/1974 | Carlsson | 425/338 |
| 3,830,613 | 8/1974 | Aoki | 425/451 X |
| 3,871,801 | 3/1975 | Buchmann | 425/4 R |

*Primary Examiner*—Robert L. Spicer, Jr.
*Attorney, Agent, or Firm*—Webb, Burden, Robinson & Webb

[57] ABSTRACT

A machine for the production of articles of foamed plastics material in a two-stage process has a first work station for a hot preforming stage and a second work station for a following cold forming stage. Each station has a two-part mould, the second mould part of each mould being movable towards and away from its first mould part by means of a fluid cylinder, and the first mould parts are connected together and mounted so as to be movable in unison in a direction at right angles to the direction of movement of the second mould parts.

5 Claims, 6 Drawing Figures

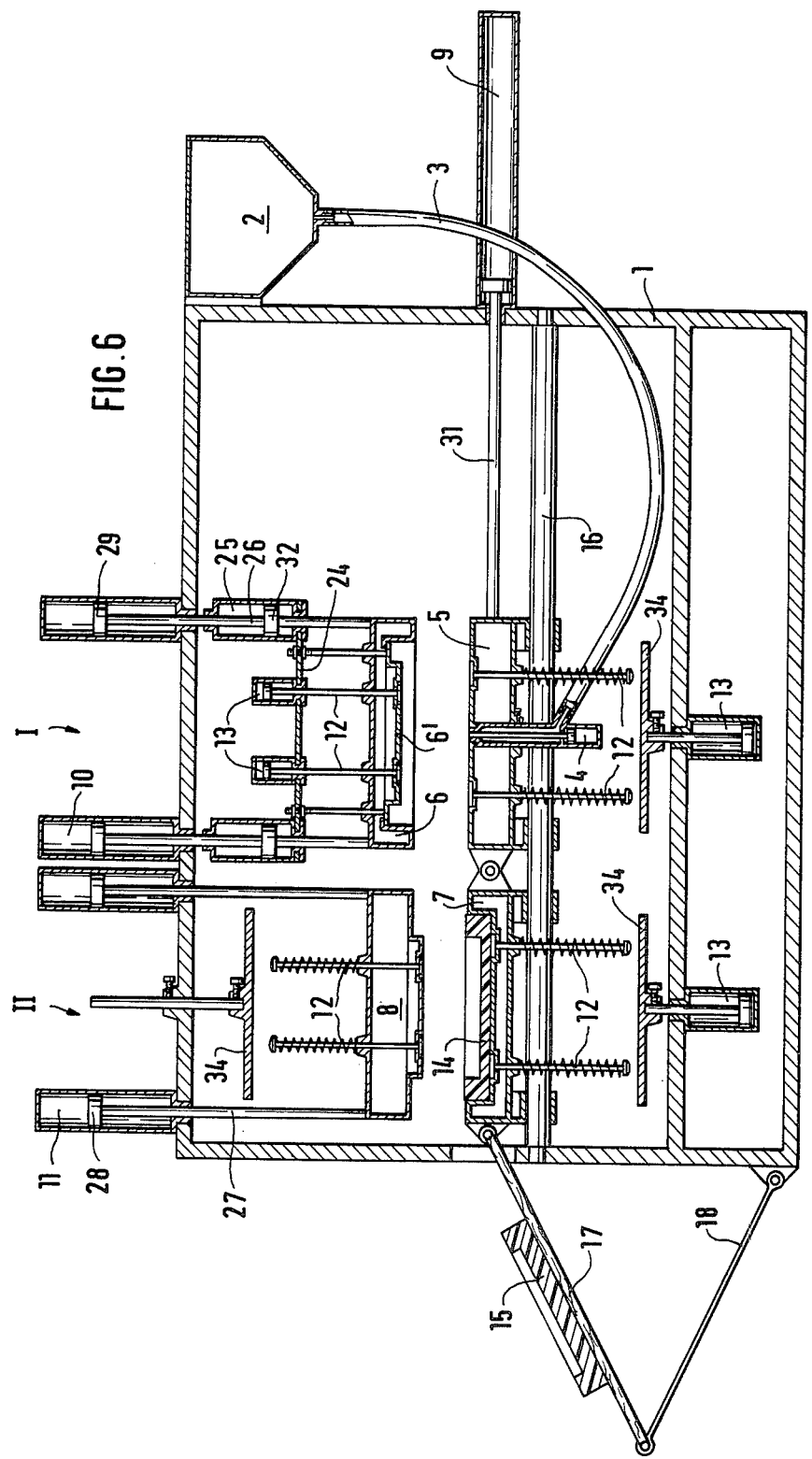

PRODUCTION OF ARTICLES OF FOAMED PLASTICS MATERIAL

FIELD OF THE INVENTION

This invention relates to a machine for the production of articles of foamed thermoplastics material in a two-stage process and having a device for transferring a shaped workpiece blank out of a mould used in a hot preforming stage of the process and into a mould used in a cold final second stage of the process.

DISCUSSION OF THE PRIOR ART

It is known, for example from U.S. Pat. No. 3,676,033 (corresponding to German Offenlegungsschrift No. 1922261), to effect savings of energy and to increase production rates to produce articles of foamed thermoplastics material in two stages, a hot preforming stage and a cold final forming stage, a machine for carrying out this process, means must be provided which bring about the transfer of the workpiece blank from the hot preforming station into the cold final forming station. In the machine described in the said U.S. patent, a swingable frame adapted to the shape of the blank is provided, which embraces the blank and transfers it from the one to the other work station. In this respect it is disadvantageous that a correspondingly shaped frame is necessary for each differently-shaped blank.

It has further been proposed to German Offenlegungsschrift No. 2011928 to abolish such a transfer member and to swing one part of a mould, which carries the blank, from the one into the other working station about a swivel axis. However, this swivel principle is constructionally very complicated, since the mould part bearing the blank not only has to be swung, but also has to be moved additionally in the axial direction, so that the two halves of the mould can be opened and closed. The mechanism (or mechanics) necessary for this is very complicated and limits the operational efficiency of such a machine to the transfer always only of a single blank.

OBJECT OF THE INVENTION

An object of the present invention is to provide a machine wherein these disadvantages are obviated or minimised and which has a movement mechanism which is simple and reliable.

BRIEF STATEMENT OF THE INVENTION

The invention provides a machine for producing articles of foamed plastics material in a two-stage process, comprising:
a frame;
a hot-preforming station in said frame having a two-part mould consisting of a first mould part and a second mould part;
first fluid cylinder means for moving said second mould part towards and away from said first mould part;
a cold final-forming station in said frame having a two-part mould consisting of a first mould part and a second mould part; and
second fluid cylinder means for moving said second mould part of said final-forming station towards and away from said second mould part of said final-forming station in a direction parallel to the direction of motion of said first fluid cylinder means;
said two first mould parts being coupled together and mounted to be capable of moving at right angles to the direction of movement of said first and second fluid cylinder means under the influence of third fluid cylinder means.

The entire movement mechanism is uniformly distributed onto the four mould parts and performs only simple rectilinear movements which can be accomplished with great accuracy and operational reliability with known hydraulic cylinders. In the preforming station and final forming station there can be arranged two or more moulds which are movable simultaneously and in the same direction and which can be moved by the same hydraulic cylinders which are incorporated in the case of a machine which has only one mould in each station. In this way, merely by the addition of further moulds, but retention of the existing hydraulics, multiplication of the output is possible.

Advantageously each of the four mould parts is equipped with hydraulically-actuated ejection rams, so that workpiece blanks (which may become lodged in the moulds) can be satisfactorily separated therefrom.

It is advisable to make one mould part of the preforming station as a split part and to make both portions of this mould part movable separately by means of their own hydraulic cylinders but in the same direction. In this way it is ensured that pre-foamed blanks possibly caking and adhering in the one mould part are contacted on a larger surface and are ejected from the mould part more carefully and reliably than would be possible with an ejection ram of small dimensions.

Advantageously there is hinged to the coupled mould part of the final forming station one edge of a reception table, to the other edge of which a swivel lever, hinged to the machine frame, is hingedly connected. This reception table, which is alternately swung into and out of the machine frame, thus ensures that the finished article is efficiently transported out of the final station of the machine.

BRIEF DESCRIPTION OF THE DRAWINGS

FIGS. 2 to 6 are views similar to that of FIG. 1, showing various work phases of the machine but leaving out various component parts which are shown in FIG. 1 for the sake of clarity.

DESCRIPTION OF A PREFERRED EMBODIMENT

Figure 1:
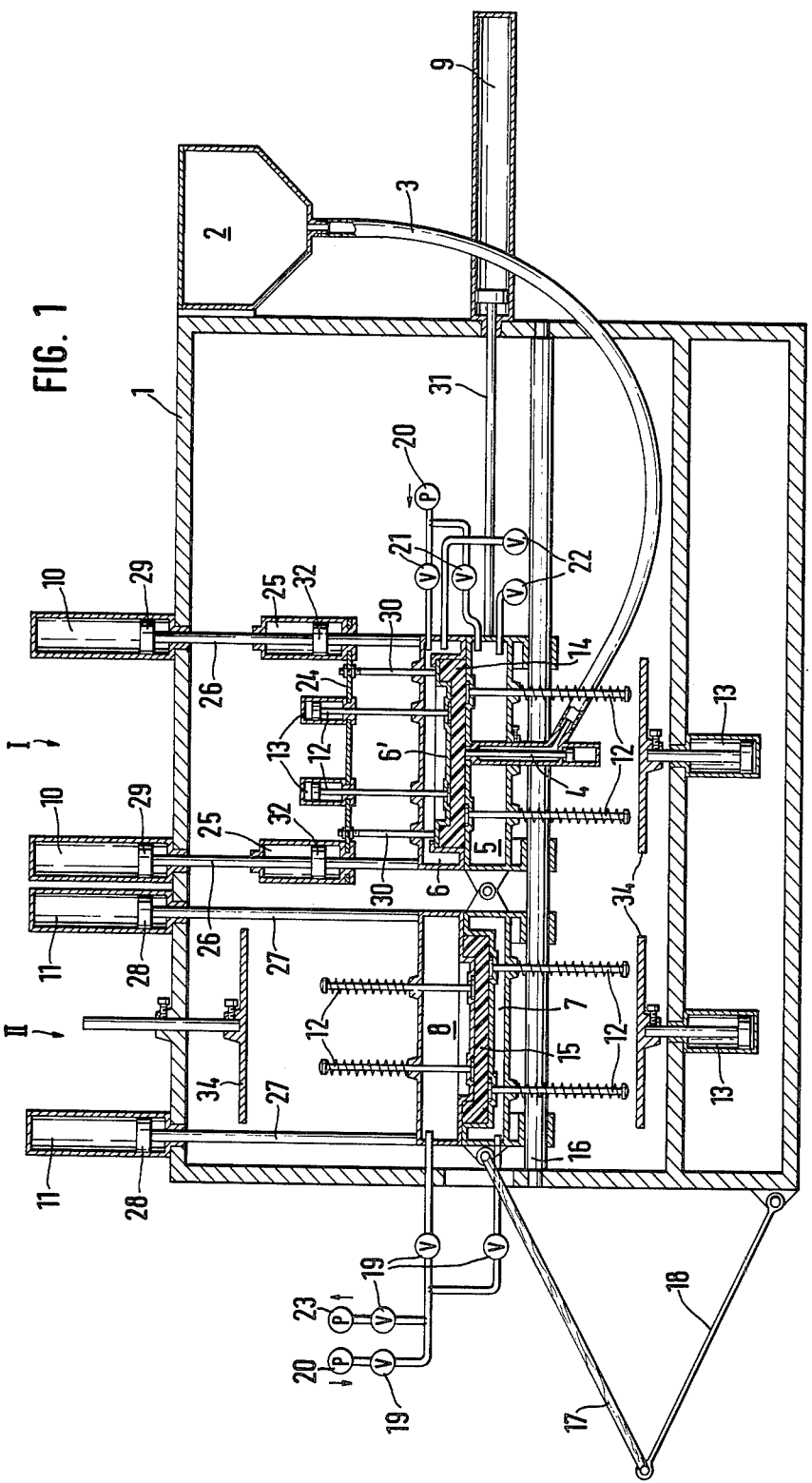
FIG. 1 is a schematic side view of a preferred machine of the invention showing all the individual parts important to the operation thereof.

A preferred machine of the invention has a stationary frame 1 having a horizontally-extending guide column (or column sleeve) fastened therein and on which respective first mould parts 5 and 7, coupled together, of a hot preforming station I and of a cold final forming station II are slidably mounted. The sliding is effected by a hydraulic cylinder 9 and a piston rod 31.

A second degree of movement directed at right angles to the direction of sliding is available to two respectively complementary second mould parts 6 and 8 which are so moved by their own hydraulic cylinders 10 and 11. The mould part 6 is connected via piston rods 26 having pistons 29 to two hydraulic cylinders 10 and a similar connection exists between the mould part 8 via piston rods 27 having piston discs 28 and the two hydraulic cylinders 11, 11.

The said mould parts 5, 6, 7 and 8 of the two moulding stations I and II are equipped with respective ejection rams 12 of which some are actuated by hydraulic cylinders 13, and some by a stop disc 34.

The mould part 6 of station I is split in design and contains a portion 6' which is movable separately and which is connected via guide rods 30 to a plate 24 which is fastened to cylinders 25 which are displaceable prependicularly relative to a piston disc 32 in the interior of the cylinder 25. Thus the possibility exists, in the case of the work phase shown in FIG. 2, to grasp a blank 14 over its entire area and to expel it, whereas the ejection rams 12 in the work phase shown in FIG. 3 take over the task of effecting a separation between the portion 6' and the blank 14 and of fixing this in the lower position. In this way a reliable transfer of the blank 14 from the mould part 6 of station I into the mould part 7 of the station II is effected. After this, the blank is brought (in accordance with the work phase shown in FIG. 6) to the left into the final forming station II and there is given its stabilised final form, which happens in the work phase illustrated in FIG. 1.

The completed work cycle is clear from the work phases shown in FIGS. 1 to 6. With the aid of the additional machine parts shown only in FIG. 1, such as control valves 19, compressed air source 20, steam valves 21, condensate valves 22 and vacuum pump 23, the four mould parts of the two forming stations I and II are correspondingly serviced and supplied. Beads of thermoplastics material are stored in a hopper 2 and are introduced via a flexible feed line 3 and a filling nozzle 4 into the cavity defined by the mould parts 5 and 6 of the pre-forming station I. Here there takes place subsequently, through corresponding introduction of steam and heating, the pre-foaming process. Simultaneously therewith there is effected, however, also the final forming of a previously formed blank 14, previously transferred to the final forming station II, in the second work station II, where the blank 14 is converted into a stabilised finally-shaped article 15.

Figure 2:
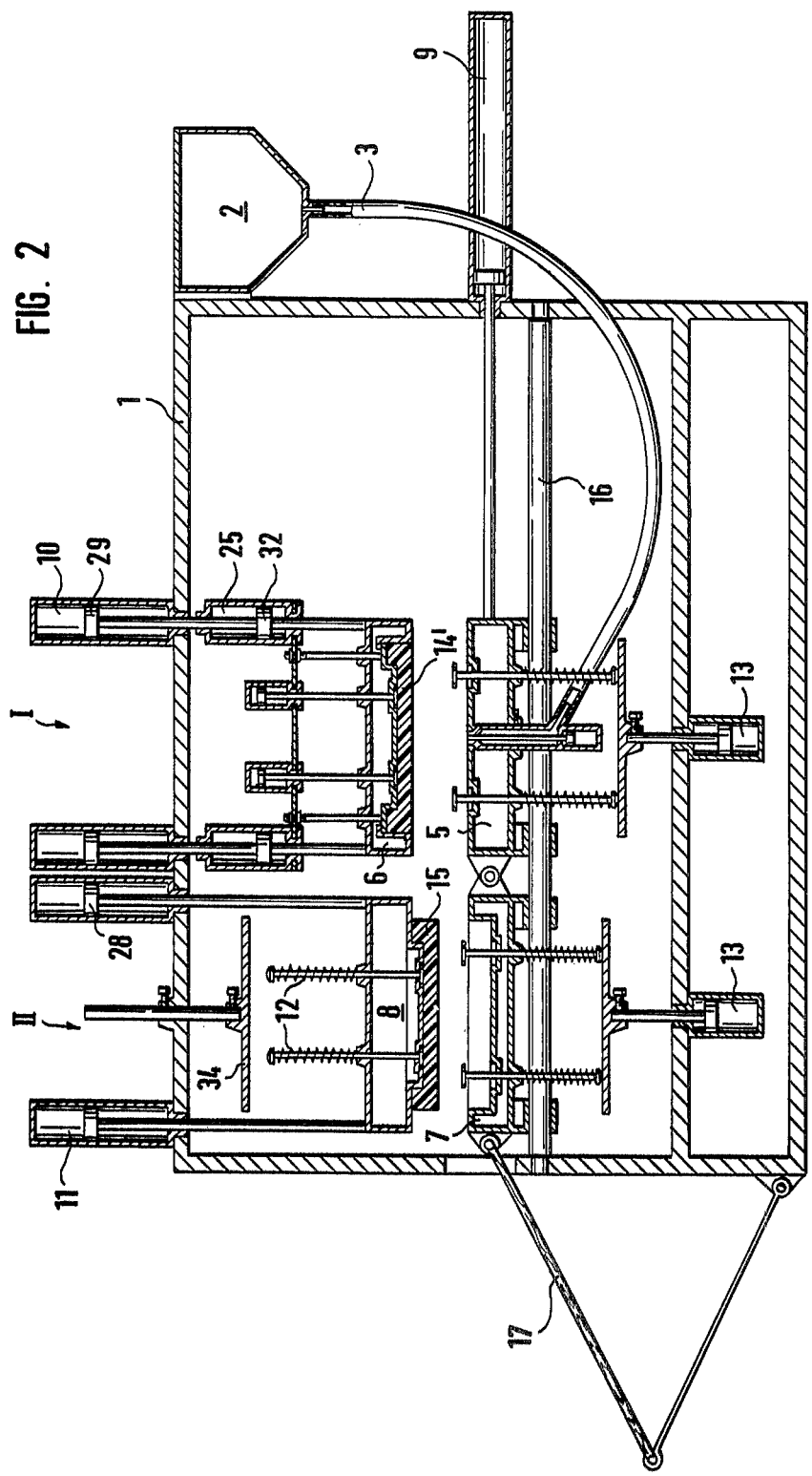
Figure 3:
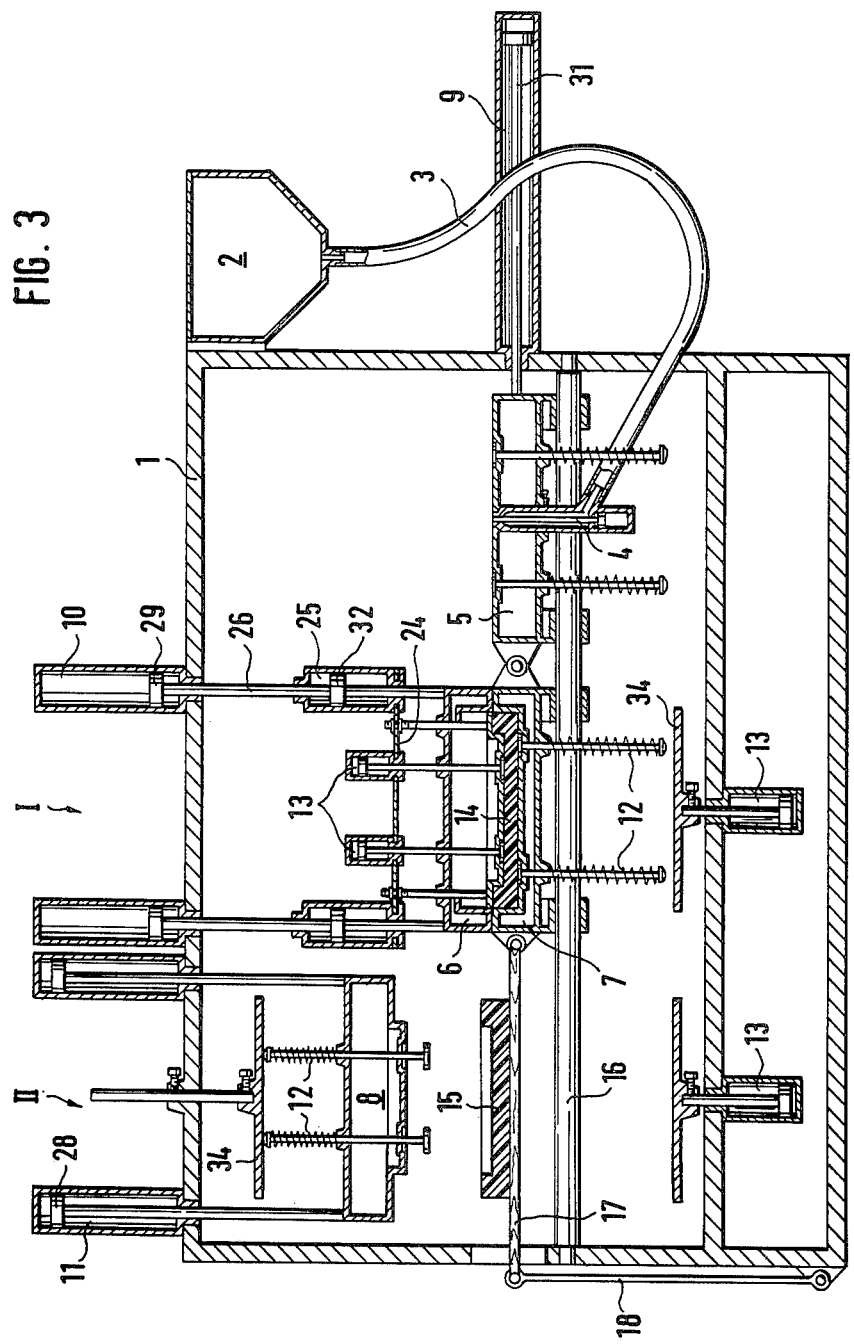
Figure 4:
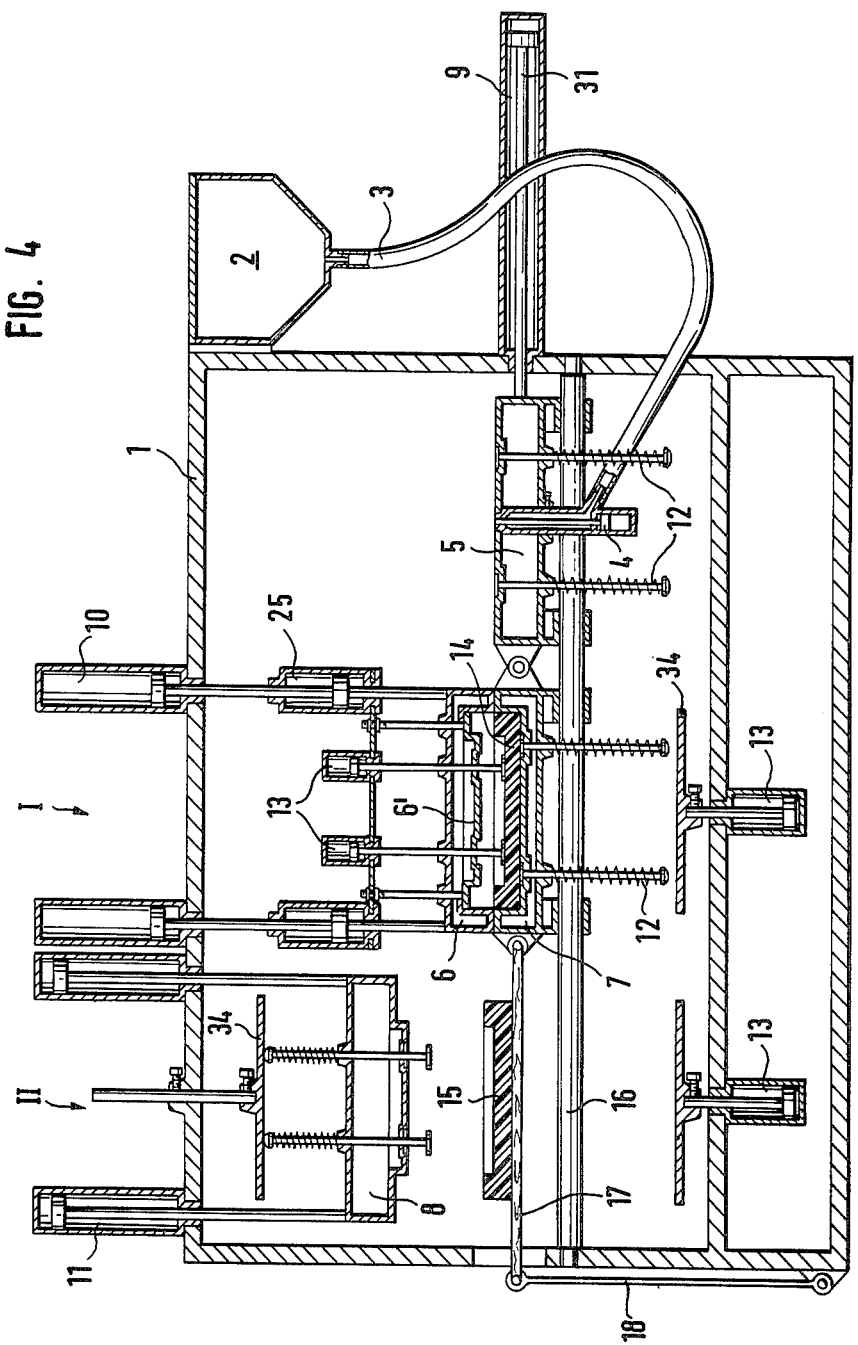
Figure 5:
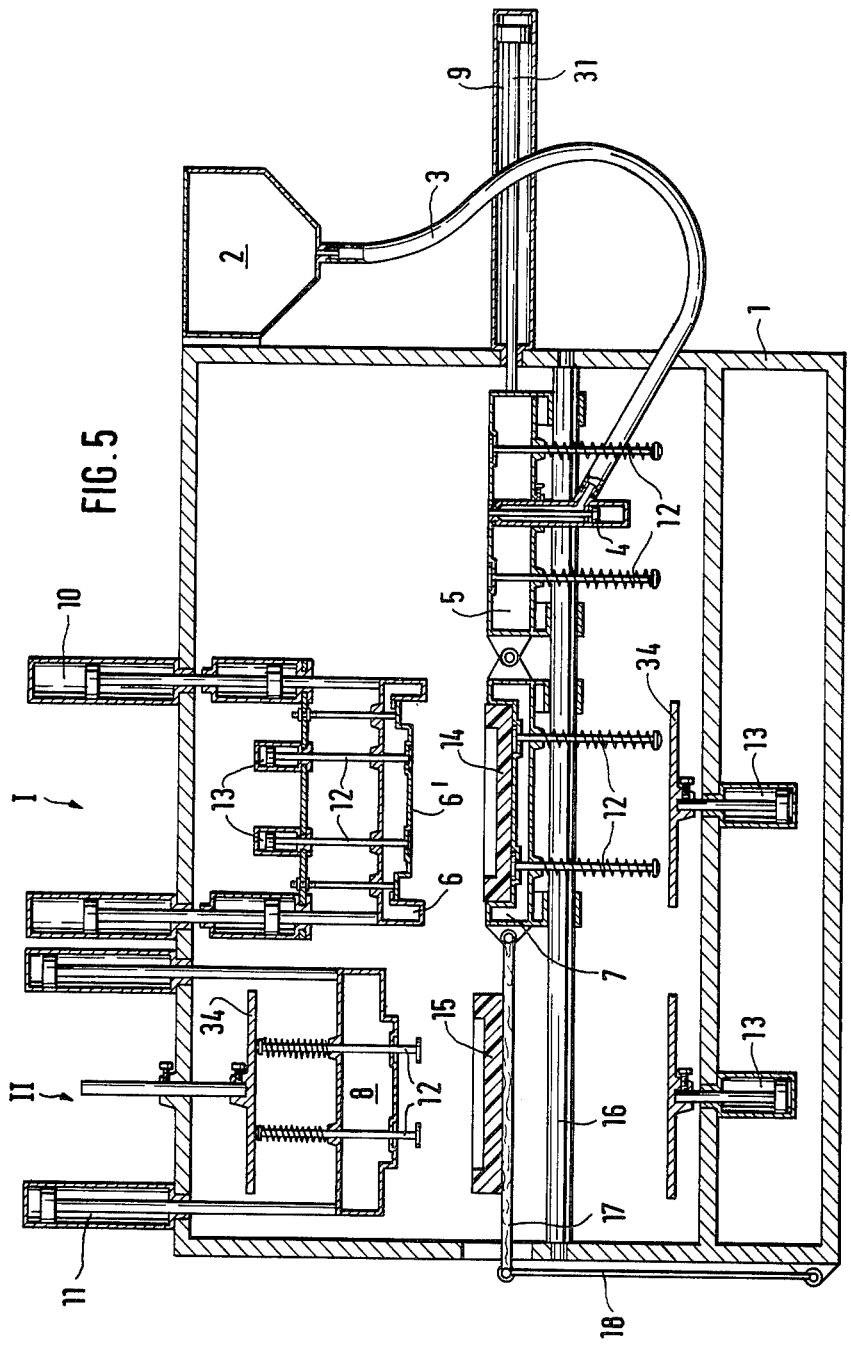

In the work phase in accordance with FIG. 2, the respectively pertinent mould parts of each forming station move apart and in the work phase in accordance with FIG. 3 the respectively shaped article and blank are expelled, after the mould parts 5 and 7, coupled together, have been shifted from left to right. The finished article 15 thus falls (in the work phase shown in FIG. 4) onto the reception table 17, which is hinged at its one edge to the forming tool part 7 and is hingedly connected by its other edge to a swivel lever 18 hinged to the machine frame 1. In this way the finally finished shaped part 15 leaves the machine in the phase shown in FIG. 6.

I claim:

1. A machine for producing articles of foamed plastics material in a two-stage process with transfer of the workpiece from a hot-preforming station to a cold final-forming station, comprising:
    a frame;
    a hot-preforming station in said frame having a two-part hot mould consisting of a first hot mould part and a second hot mould part;
    first fluid cylinder means for moving said second hot mould part towards and away from said first hot mould part only in the direction of pressing;
    a cold final-forming station in said frame having a two-part cold mould consisting of a first cold mould part and a second cold mould part; and
    second fluid cylinder means for moving said second cold mould part of said final-forming station towards and away from said first cold mould part of said final-forming station only in a direction parallel to the direction of motion of said first fluid cylinder means;
    said two first mould parts being coupled together and mounted to be capable of shifting at right angles to the direction of movement of said first and second fluid cylinder means under the influence of third fluid cylinder means,
    control means for the cylinders,
    such that the workpiece is first formed in the hot-preforming station when the first and second hot mould parts of the hot mould are aligned, the workpiece is then carried with the second hot mould part as the two parts are separated, the first parts of the hot and cold moulds are shifted to align the second part of the hot mould and the first part of the cold mould and transfer of the workpiece is effected from one to the other, the first parts of the hot and cold moulds are again shifted to align the first and second parts of the cold mould and cold forming is effected, the workpiece is then carried by the second part of the cold mould as the two parts of the cold mould are separated, the first part of the cold mould is shifted out of alignment and the finished article is ejected from the second part of the cold mould.
2. A machine as claimed in claim 1, wherein each of said four mould parts is provided with hydraulically-actuated ejection rams.
3. A machine as claimed in claim 1, wherein said second mould part of said preforming station is in two portions, both said portions being movable separately in the same direction by means of a hydraulic cylinder.
4. A machine as claimed in claim 1, wherein there is hinged to said first mould part of said final forming station one edge of a reception table whose other edge is hingedly connected to one end of a swivel lever whose other end is hinged to said frame.
5. A machine as claimed in claim 1, characterised by the provision, in said preforming station and in said final forming station, of an additional are two or two part mould, whose parts are movable co-extensively and simultaneously with the said mould parts.

* * * * *

UNITED STATES PATENT OFFICE
CERTIFICATE OF CORRECTION

PATENT NO. : 4,106,884
DATED : August 15, 1978
INVENTOR(S) : Johann Friedrich Jegelka It is certified that error appears in the above-identified patent and that said Letters Patent are hereby corrected as shown below:

After the line listing the application serial number insert:

--Foreign Application Priority Data

Mar. 31, 1976 Germany P2613768 --.

Column 1 Line 11 After "final" insert --forming--.

Signed and Sealed this

Thirteenth Day of March 1979

[SEAL]

Attest:

RUTH C. MASON
Attesting Officer

DONALD W. BANNER
Commissioner of Patents and Trademarks